US011337485B2

(12) United States Patent
Sharpes

(10) Patent No.: US 11,337,485 B2
(45) Date of Patent: May 24, 2022

(54) WEARABLE PLANETARY GEAR CONFIGURATION

(71) Applicant: The Government of the United States, as represented by the Secretary of the Army, Washington, DC (US)

(72) Inventor: Nathan Sharpes, Abingdon, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 260 days.

(21) Appl. No.: 16/550,333

(22) Filed: Aug. 26, 2019

(65) Prior Publication Data

US 2020/0072319 A1 Mar. 5, 2020

Related U.S. Application Data

(60) Provisional application No. 62/724,824, filed on Aug. 30, 2018.

(51) Int. Cl.
*F16H 57/10* (2006.01)
*A43B 3/00* (2022.01)
(Continued)

(52) U.S. Cl.
CPC ............ *A43B 3/0015* (2013.01); *A41D 1/002* (2013.01); *A43B 21/24* (2013.01); *A43B 21/30* (2013.01); *F16D 41/00* (2013.01); *F16D 67/02* (2013.01); *F16H 3/44* (2013.01); *F16H 57/10* (2013.01); *H02J 7/32* (2013.01); *H02K 7/112* (2013.01);
(Continued)

(58) Field of Classification Search
CPC .............. F16H 3/54; F16H 33/02; F16H 3/44; F16H 57/10; F16H 2200/0034; F16H 2200/20; F16H 2200/2005; F16H 2200/2035; F16H 2200/2066; F16H 2200/2082; H02J 7/1407; H02J 7/143; H02J 7/32; H02J 7/00032; F16D 49/00; F16D 41/00; F16D 67/02; B60T 1/14; B60T 1/04; A43B 3/0015; A43B 21/30; A43B 21/24; A43B 3/0031;
(Continued)

(56) References Cited

U.S. PATENT DOCUMENTS

2008/0097269 A1* 4/2008 Weinberg ............... A61F 5/0125 602/16
2010/0010409 A1* 1/2010 Bejarano ............... A61F 5/0125 602/16
(Continued)

*Primary Examiner* — Justin Holmes
(74) *Attorney, Agent, or Firm* — Ronald Krosky

(57) ABSTRACT

A wearable system, such as a footwear system, can employ a generator. The generator can be powered by human movement, such as movement of knee as a person walks or runs. When the knee resets, it can be desirable to have a relatively equal gear ratio to achieve near natural movement. Conversely, it can be desirable to have a high gear ratio when the knee pushes off to achieve high generator rotation to produce a high amount of power. This can be achieved with employment of a wearable planetary gear set configuration In practicing this wearable planetary gear set, torque can be provided from the source (e.g. human ankle joint) when power negative and not at other times during a movement cycle, meaning energy can be harvested from the walking motion without inducing additional burden to the device wearer.

19 Claims, 14 Drawing Sheets

(51) Int. Cl.
    *A43B 21/24*     (2006.01)
    *H02J 7/32*     (2006.01)
    *H02K 7/18*     (2006.01)
    *A43B 21/30*     (2006.01)
    *F16D 41/00*     (2006.01)
    *F16D 67/02*     (2006.01)
    *H02K 7/112*     (2006.01)
    *A41D 1/00*     (2018.01)
    *F16H 3/44*     (2006.01)
    *H02K 7/116*     (2006.01)
    *H02J 7/00*     (2006.01)

(52) U.S. Cl.
    CPC ........... H02K 7/116 (2013.01); H02K 7/1853 (2013.01); *F16H 2200/0034* (2013.01); *F16H 2200/20* (2013.01); *F16H 2200/2005* (2013.01); *H02J 7/00032* (2020.01)

(58) Field of Classification Search
    CPC ........ A41D 1/002; H02K 7/116; H02K 7/112; H02K 7/1853
    See application file for complete search history.

(56) References Cited

U.S. PATENT DOCUMENTS

2013/0296746 A1* 11/2013 Herr .................. A63B 21/4015
    601/34
2014/0123449 A1* 5/2014 Soderberg .............. A43C 1/006
    24/712.1

* cited by examiner

WEARABLE PLANETARY GEAR CONFIGURATION

CROSS-REFERENCE

This application claims priority to U.S. Provisional Application No. 62/724,824 filed on Aug. 30, 2018. U.S. Provisional Application No. 62/724,824 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Batteries can be used to store energy. In one example, a cellular telephone or radio can be powered by batteries. Without being physically tethered to a wall outlet, this gives the user a great amount of physical freedom when using the cellular telephone or radio.

However, batteries have a finite storage capacity. The cellular telephone or radio can drain a battery until the battery is drained. Therefore, the cellular telephone or radio can have a limited amount of usage until the battery is replaced or recharged.

SUMMARY

In one embodiment, a system can comprise a sun gear and a planet gear set physically coupled to the sun gear. The system can also comprise a ring gear physically coupled to the planet gear set and a planet carrier that unifies the planet gear set. The sun gear, the planet gear, the ring gear, and the planet carrier can be retained within a wearable item.

In another embodiment, a method can comprise operating a wearable planetary gear configuration during a first phase and operating the wearable planetary gear configuration during a second phase. The first phase and the second phase can be are about consecutive and the wearable planetary gear configuration can comprise a sun gear, a planet gear set, a ring gear, and a planet carrier. The planet gear set can physically coupled to the sun gear, the ring gear can be physically coupled to the planet gear set, and the planet carrier can unify the planet gear set. During the first phase the ring gear can be stationary, the planet carrier can be the input, the planet gear set can rotate, and the sun gear can rotate in response to the rotation of the planet gear set. During the second phase the sun gear can be stationary, the planet carrier can be the input, the planet gear set can rotate, and the ring gear can rotate in response to the rotation of the planet gear set.

In yet another embodiment, a system can comprise a sun gear and a planet gear set physically coupled to the sun gear. The system can also comprise a ring gear physically coupled to the planet gear set, a planet carrier configured to unify the planet gear set and a brake configured to, when engaged, hold the ring gear stationary. The ring gear can be floating along an axis when the brake is not engaged and, in response to the ring gear being stationary, the sun gear can be configured to rotate. The sun gear, the planet gear, the ring gear, the planet carrier, and the brake can be retained within a footwear item, where the ring gear can be configured to rotate in response to foot movement of a wearer of the footwear item when the brake is disengaged.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIGS. 1A-1B illustrate four separate figures, but can collectively be referred to as 'FIG. 1."

DETAILED DESCRIPTION

Figure 1A:
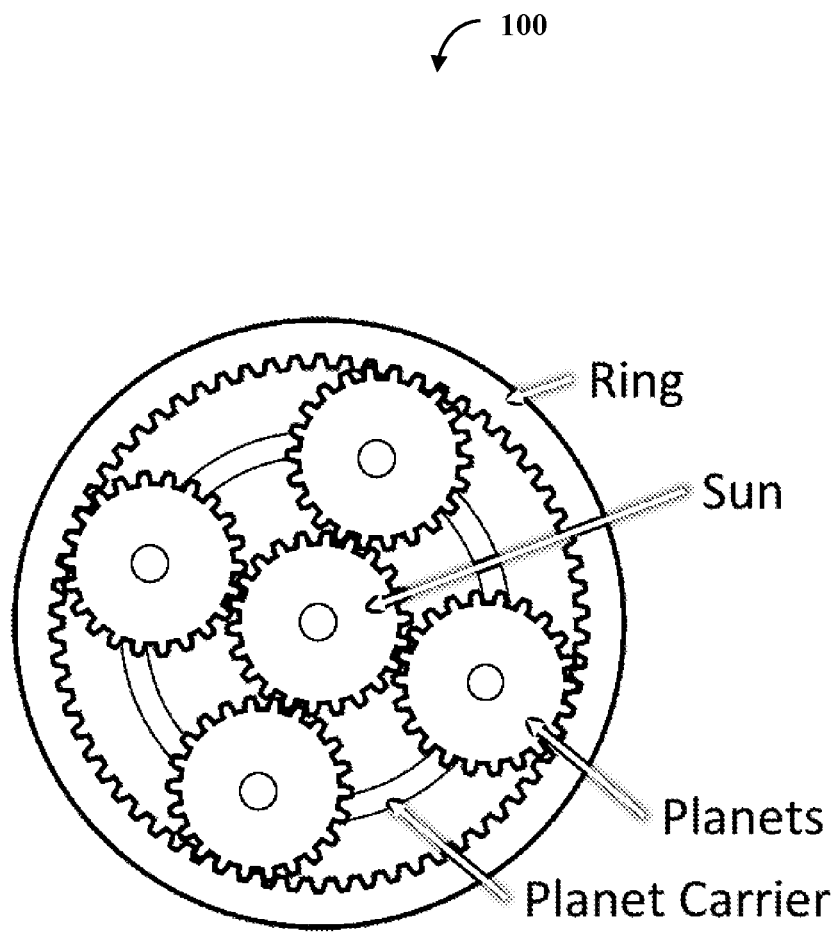
FIG. 1A illustrates one embodiment of a planetary gear set.

A person can wear hardware that converts physical motion into electrical energy. The electrical energy can recharge a battery, such as a battery of a personal electronic device (e.g., a cellular telephone or radio). In one embodiment, leg motion from walking or running can be leveraged to produce battery charging energy.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 1B:
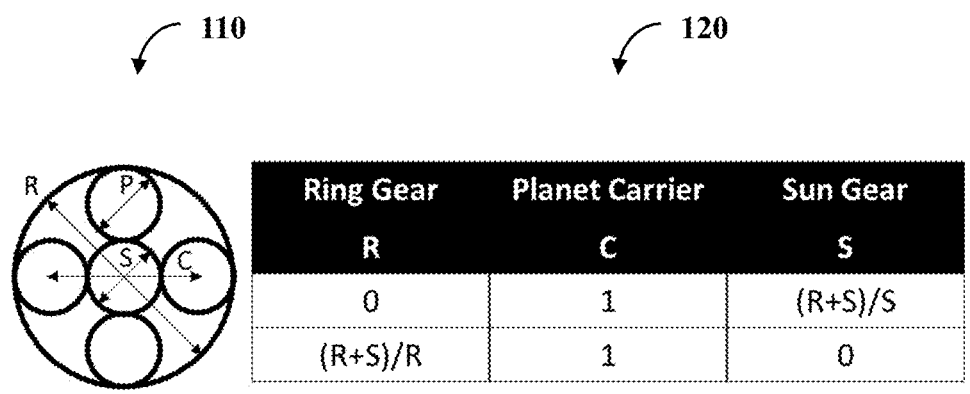
FIG. 1B illustrates one embodiment of a conceptual planetary gear set and a ratio chart.

FIG. 1A illustrates one embodiment of a planetary gear set 100 while FIG. 1B illustrates one embodiment of a conceptual planetary gear set 110 and a ratio chart 120. The planetary gear set 100 can comprise a sun gear, a planet gear set physically coupled to the sun gear, a ring gear physically coupled to the planet gear set, and a planet carrier that unifies the planet gear set. The sun gear, the planet gear, the ring gear, and the planet carrier can be retained within a wearable item. The wearable item can be a footwear item (e.g., an insole housing of a boot) as well as be a joint-based wearable item (e.g., knee brace or ankle torque device) such that rotation of the sun gear and rotation of the planet carrier are derived from movement of a joint of a wearer of the wearable item. The sun gear and ring gear of the wearable item can have an interrelated gear ratio.

In mechanical systems powered by high force/torque low displacement/rotation sources, it can be desirable for the gear ratio to be configured such that there is an increase the displacement/rotation at the cost of force/torque. For reciprocating applications, it can be the case where it is desired to employ a gear ratio in one (driven) direction, while having no load on the source in the opposite (resetting) direction. The operation can be accomplished by physically disconnection a drive train (or drivetrain) during the resetting motion and reconnecting it during the driven motion. Physical disconnect can occur using a ratchet or one-way clutch. However, this solution is limited in that it has unidirectional motion while power transmission is disconnected. To allow for bi-directional motion during disconnect, a clutch can be employed, introducing a break in the drivetrain. Though, for compact systems, such as wearable devices, a clutch at such small scale can be difficult to implement which is able to transfer high torque. It is then advantageous to have a way to keep the drivetrain physically connected at virtually all times (e.g., at all times), but still be able to route torque away from the output, such that the source is not loaded during a reset type motion (even a bi-directional resetting motion), creating a pseudo-clutch.

FIG. 1B illustrates the relationship of the output member for the cases where the planet carrier is the driving member and either the ring or sun gears are stationary (e.g., alternating base on energy producing phase or resetting phase). This provides relative rotation ratios for two different configurations—one where the ring gear is stationary and one where the sun gear is stationary. Zero indicates a stationary member, while one indicates the driving member. The output gear motion is, then, given as a ratio. The drivetrain's rotation can be normalized to one, the stationary member's rotation can be about zero, and the output member's rotation can be a ratio of the geometry of the sun and ring gears.

In one embodiment, the planet gear set can comprise a first planet gear and a second planet gear, such as with four gears as FIG. 1A illustrates. The first planet gear and the second planet gear can be of about equal size, be opposite one another, and be separated by the sun gear. The sun gear can be of about equal size to the planet gears and be physically coupled to the individual planet gears. However, the sun gear and planet gears can be of different size, such as the sun gear being larger than the planet gears. Further, the ring gear can encompass the first planet gear, the second planet gear, and the sun gear.

In view of the about equal sizes of the sun and planet gears, with the ring gear being of a diameter 'R' and the sun gear having a diameter of 'S', the ring gear would have a diameter 3 times of 'S' in view of the physical properties and the planet carrier can be normalized to 1.

When the ring gear is the stationary member, the ratio for the sun gear can be based on the equation:

$$\frac{R+S}{S} \quad (1)$$

With the configuration of the last paragraph, the gear ratio would be 1:4 (e.g., every rotation of the planet carrier yields four rotations of the sun gear). This would be greater than 1:2. When the sun gear is the stationary member, the ratio for the ring gear can be based on the equation:

$$\frac{R+S}{R} \quad (2)$$

With the configuration of the last paragraph, the gear ratio would be 1:1.33 (e.g., every rotation of the planet carrier yields one and a third rotations of the ring gear). This would be less than 1:1.5

Figure 2:
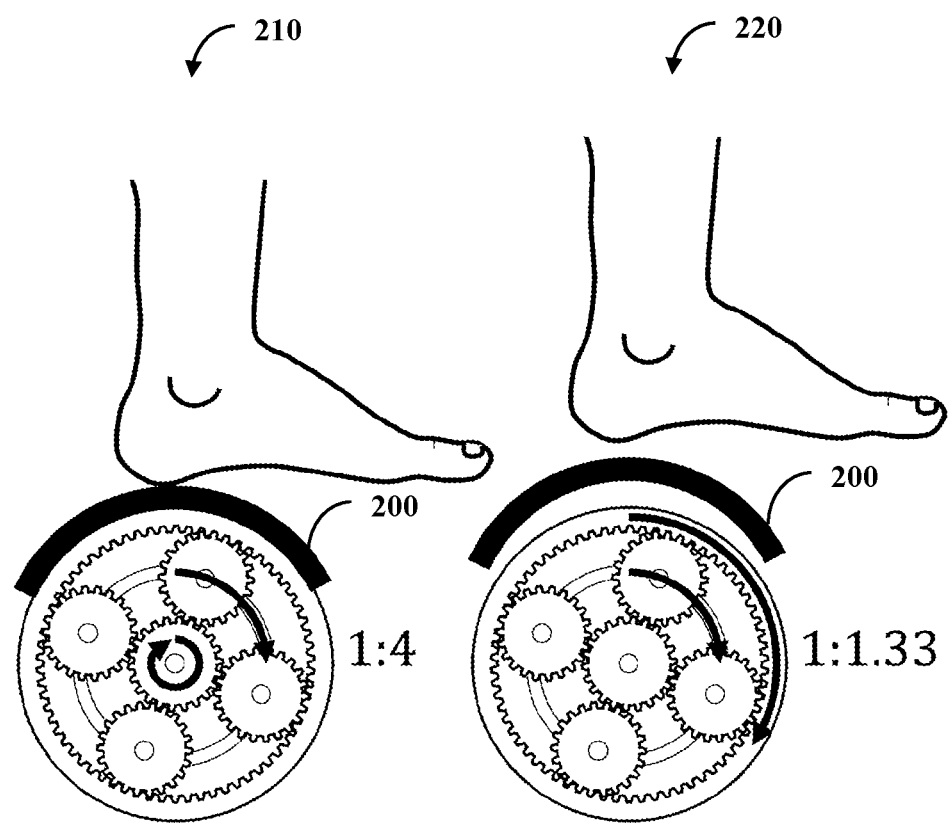
FIG. 2 illustrates one embodiment of a brake being engaged by a foot and the brake being disengaged by the foot.

FIG. 2 illustrates one embodiment of a brake 200 being engaged by a foot 210 (and in turn causing the ring gear to be stationary) and the brake 200 being disengaged by the foot 220 (and in turn causing the sun gear to be stationary). When the foot is on the ground, the brake 200 holds the ring gear stationary and the resultant output is the sun gear in a 1:4 ratio compared to the input planet carrier. When the foot is off the ground, the brake 200 is released and the resultant output is the ring gear in a 1:1.33 ratio compared to the input planet carrier.

The planet carrier can receive torque from a high-torque low-rotation source and the sun gear can be connected to subsequent parts of a drivetrain (e.g., a spring or transition gear set), and the ring gear can be floating (e.g., not connected to any other parts of the drive train). For the planetary gear set 100 of FIG. 1, one member can be held stationary, one member can be driving (e.g., providing torque), and one member can be the output. The ring gear is floating along an axis when the brake is not engaged and can rotate in response to movement of a wearer of the wearable item when the brake is disengaged. When engaged, the brake can hold the ring gear stationary and, in response to the ring gear being stationary, the sun gear can be configured to rotate.

Rotation of the sun gear can cause direct rotation of a generator (e.g., by way of an axial drivetrain). However, this can also be a phased rotation. In one example, the sun gear can be physically coupled to a spring and the spring can be physically coupled to the generator. The spring can be a rotational spring (e.g., power spring or torsion spring) or a linear spring (e.g., compression spring or tension spring). When the ring gear is stationary, the sun gear can rotate such that the spring is supplied with potential energy. When the sun gear is stationary, the spring potential energy is released to the generator so the generator produces an electricity. As an example with the spring being a rotational spring, when the brake is engaged the spring can wind-up so as to be loaded with potential energy. When the brake is released, the spring can become decoupled and unload the wound-up energy. The generator can be supplied with this un-wound energy and produce an electricity. The electricity can power a personal electronic device of a wearer of the wearable item, such as charging a battery of the personal electronic device.

As illustrated in FIG. 2, since the ring gear is floating, if it is not held stationary, when torque is input from the planet carrier, the inertia of the drive train connected to the sun gear makes it the stationary member, resulting in the ring gear being the de facto output. In the case where the sun and planet gears are the same diameter, the level of input torque is only at a level to turn the ring gear at a 1:1.33 ratio. Given the low relative inertia of the ring gear itself and near unity ratio of this configuration, essentially negligible torque can be required for motion. In this way, the input is effectively disconnected from the drive train. In this configuration resetting moves can be made bidirectional, with torque driving the ring gear, which is not connected to any other part of the drivetrain (e.g., floating). If the ring gear is held stationary, for example via the brake (e.g., a boot actuated drum brake), when torque is input through the planet carrier, and sun and planet gears are the same diameter, the sun gear (and drive train) is rotated at a 1:4 ratio, converting the high torque low rotation input into lower torque but higher rotation motion. This is the driven phase of the process.

Figure 3:
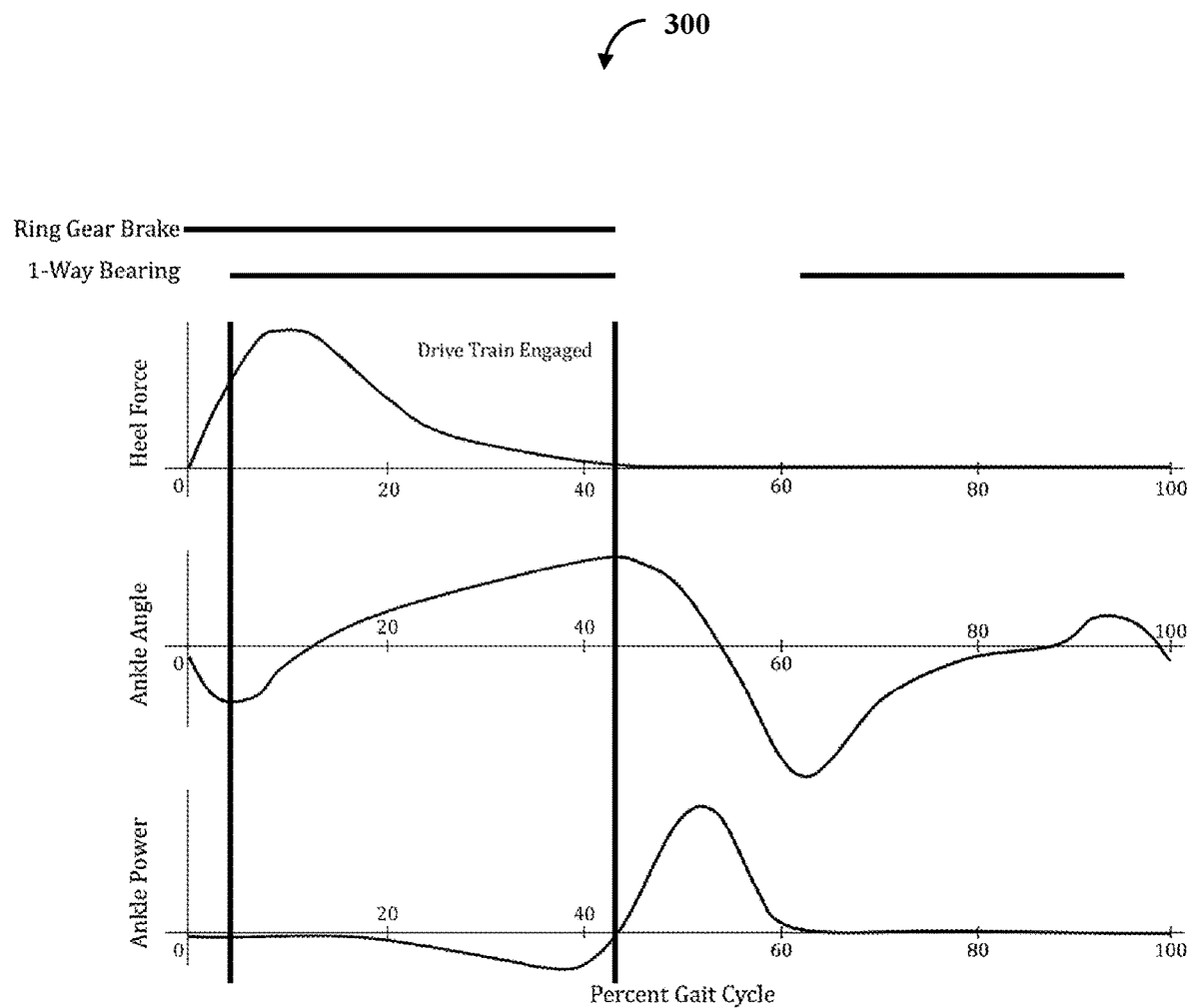
FIG. 3 illustrates a graph set with three graphs.

FIG. 3 illustrates a graph set 300 with three graphs—a graph for force on the heel section of the foot during a gait cycle (e.g., the gait cycle begins at heel strike), ankle angle (e.g., where zero degrees is the shank perpendicular to the foot), and ankle power. Also illustrated for these three graphs are the periods of engagement for the one-way clutch bearing, ring gear brake, and resultant drive train engagement. The plotted curves are represented qualitatively, but based on example usage of persons walking boots.

The ring gear can be constrained by the brake 200 of FIG. 2 (e.g., foot actuated brake), and torque can be input from the rotation of the ankle joint. Because of the motion of the ankle joint, show in FIG. 3, the planetary gear pseudo-clutch may not quite be adequate, as drive train motion would be reversed during the early part of the gait cycle. For this reason, a one-way clutch component (e.g., a one-way bearing) can be added before the planetary gear set, such that torque is input to the planetary gear set when dorsiflexion occurs (i.e. ankle velocity is positive). The one-way clutch component can provide input to the planetary gear when velocity of the joint is positive and prevent input to the planetary gear when velocity of the joint is negative. In this way, torque is only required from the source (e.g. human ankle joint) when power negative, meaning energy can be harvested from the walking motion without inducing additional burden to the device wearer.

Figure 4:
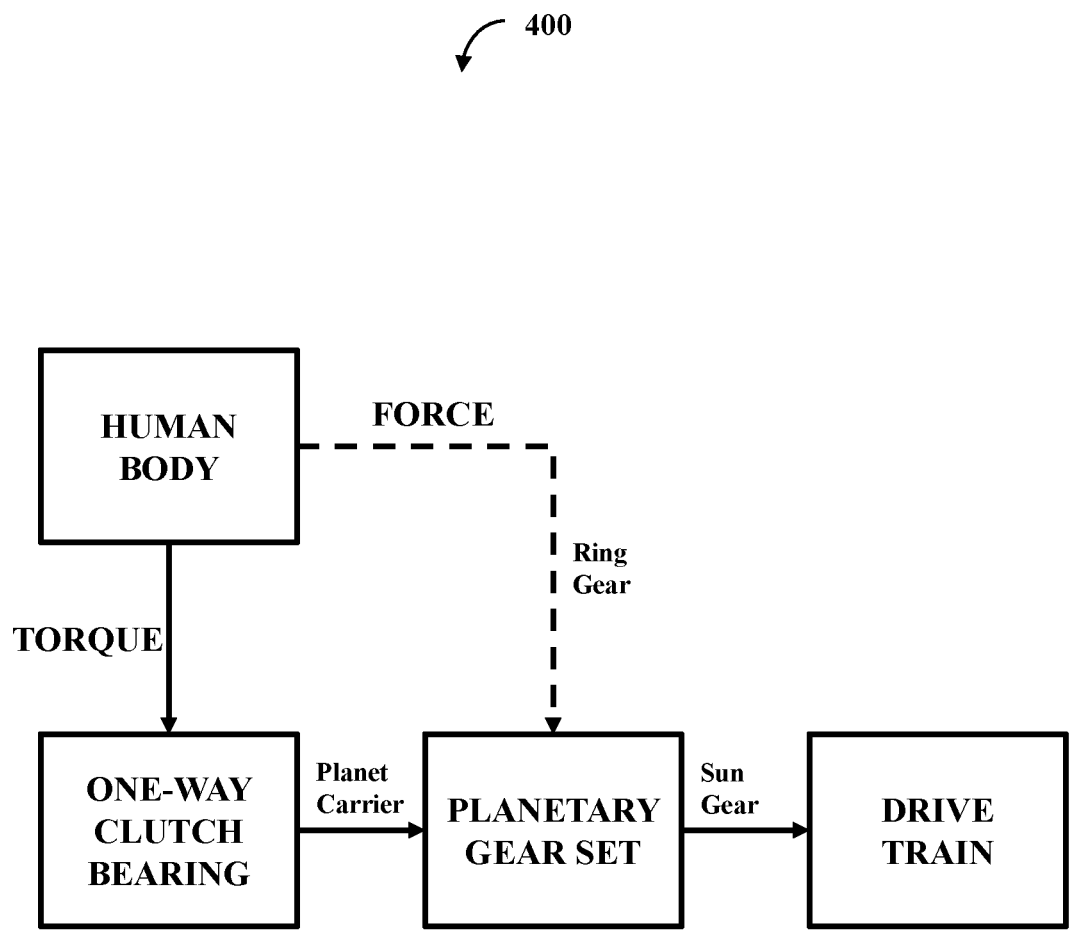
FIG. 4 illustrates one embodiment of an energy flow.
Figure 5A:
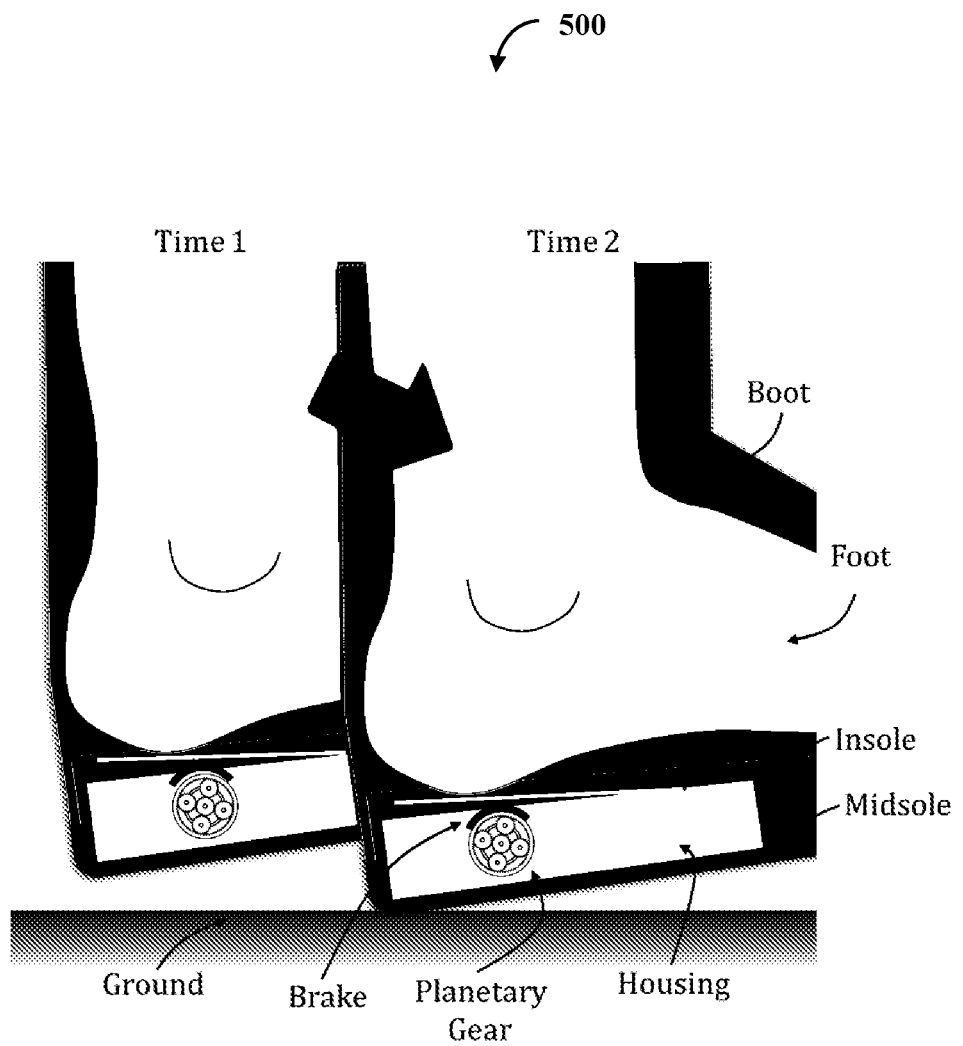
FIG. 5A illustrates one embodiment of a brake actuation in response to pressure directly from the foot.
Figure 5B:
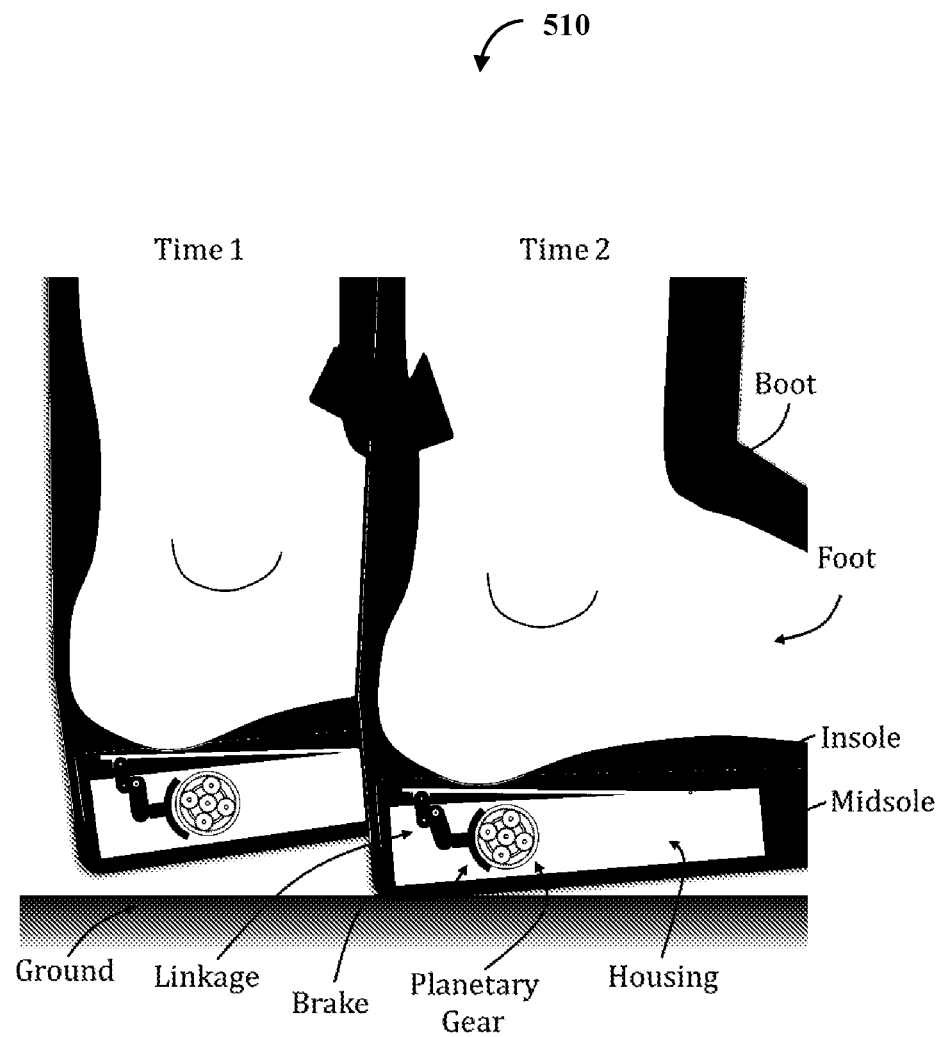
FIG. 5B illustrates one embodiment of a brake actuation in response to pressure from the foot by way of a linkage.
Figure 5C:
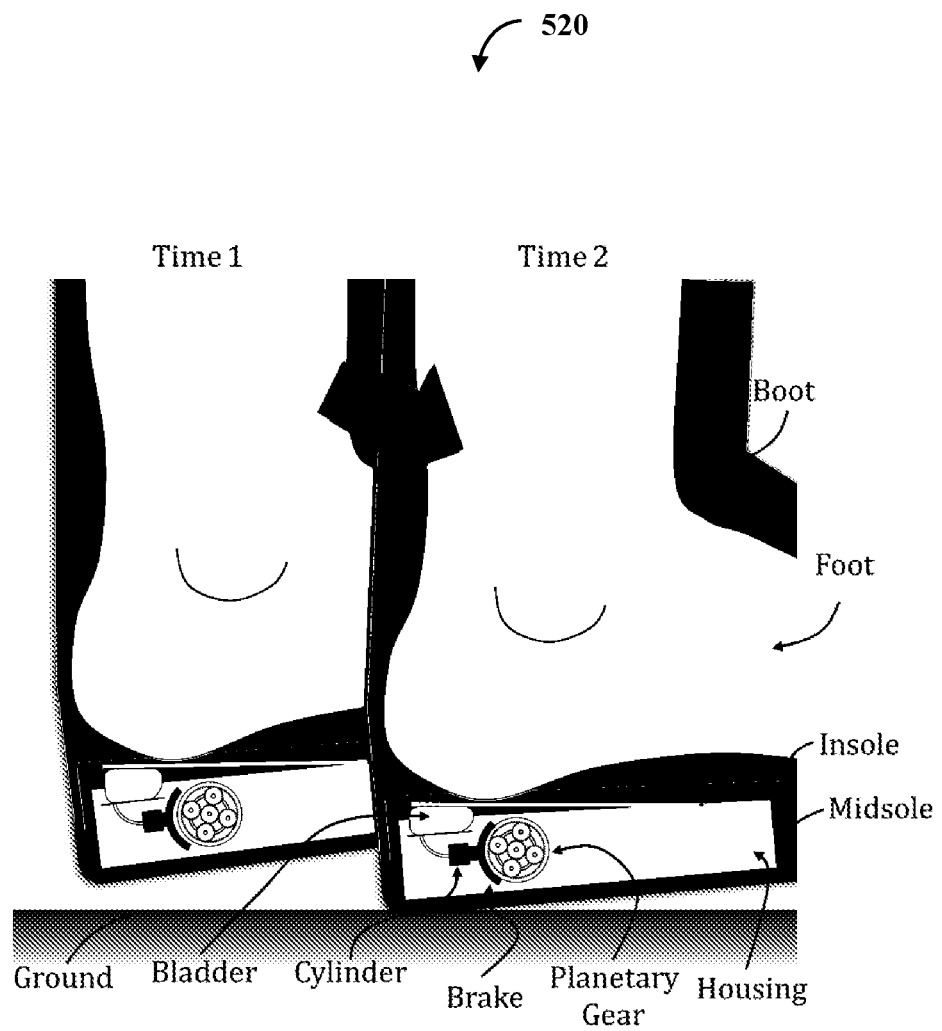
FIG. 5C illustrates one embodiment of a brake actuation in response to pressure from the foot though employment of fluid medium.
Figure 5D:
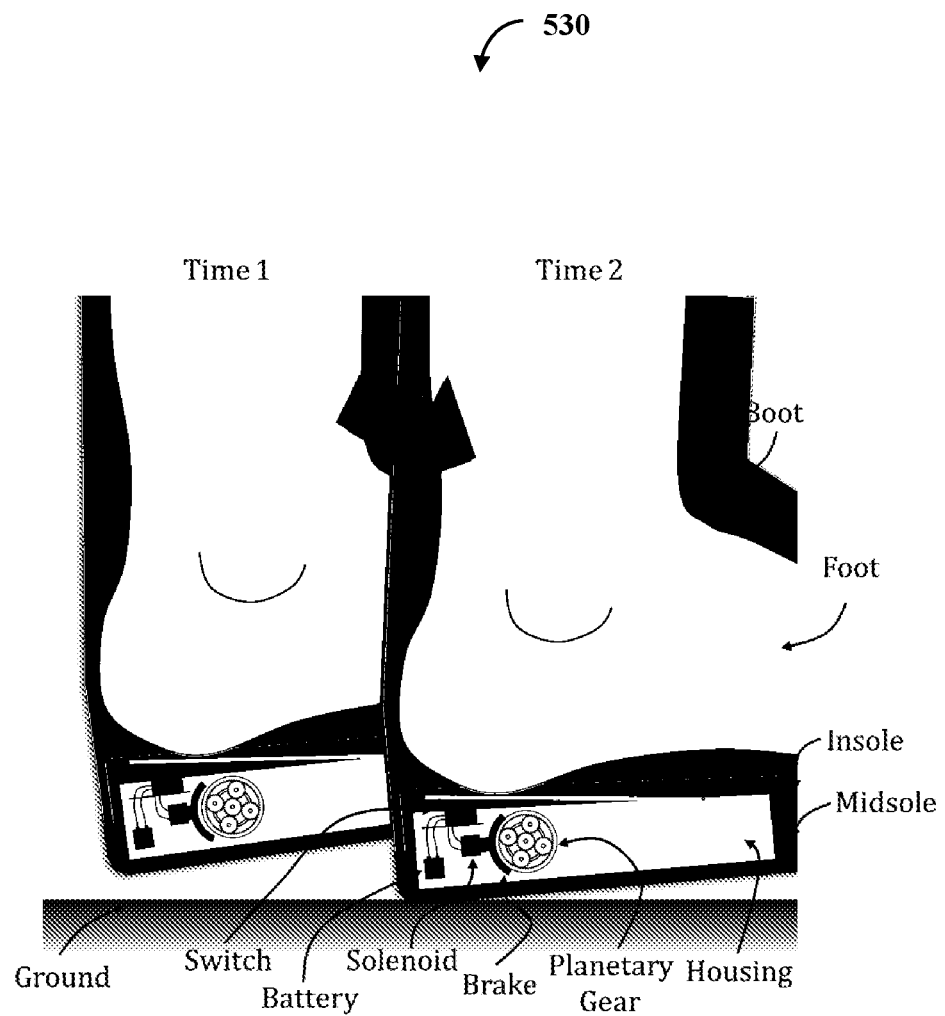
FIG. 5D illustrates one embodiment of a brake actuation in response to pressure from the foot indirectly.

FIG. 4 illustrates one embodiment of an energy flow 400, such as flow from a human body to a drivetrain. Torque and force can be utialized from the body during the gait cycle to control the actuation of the drive train, through a combination of one-way clutch bearing, which funcitons as a one-way clutch component, and planetary gear set.

As illustrated in the graph 300 of FIG. 3, the drive train can be limited in engagement to when the power output of the ankle is negative. Therefore, the torque driving the drive train is negative work, and can be harnessed without adversely affecting the gait cycle, like would be the case if the drive train were engage when ankle power were positive (e.g., push-off phase) or later in the gait cycle (e.g., swing phase) when power is close to zero. When the planetary gear pseudo-clutch is disengaged, the motion of the ankle can be bi-directional, as can be seen in the graph 300 of FIG. 3, which is allowed by the mechanism with negligible torque to make this resetting move.

FIG. 5A-5D illustrate four embodiments of implementations 500-530 of the planetary gear set 100 of FIG. 1 in a shoe (e.g., boot) insole/midsole housing, depicted just before (e.g. Time 1) and just after (e.g. Time 2) heel strike. With the implementations 500-530, the braking of the ring gear can be actuated by the pressure exerted on a movable section of a device housing embedded within the midsole of the shoe. This force can physically displace a drum brake, against the ring gear, rendering it stationary. The drum brake can rely on friction or positive mechanical engagement to hold the ring gear stationary.

The implementation 500 illustrates brake actuation in response to pressure directly from the foot. When the foot is off the ground the brake does not make contact with the ring gear. However, when the foot is on the ground the brake holds the ring gear stationary.

The implementation 510 illustrates brake actuation in response to pressure from the foot by way of a linkage, such that even a small depression of the can move the brake against the ring gear. When the foot is off the ground the brake does not make contact with the ring gear. However, when the foot is on the ground the brake holds the ring gear stationary. A linkage amplifies the depression of the housing, to make it as slight as possible, to actuate the brake.

The implementation 520 illustrates brake actuation in response to pressure from the foot though employment of fluid medium, such as a hydraulic bladder and cylinder. When the foot is off the ground the brake does not make contact with the ring gear. However, when the foot is on the ground the brake holds the ring gear stationary. A hydraulic/pneumatic bladder supplies pressure to a hydraulic/pneumatic cylinder, causing it to displace and apply force to the brake.

The implementation 530 illustrates brake actuation in response to pressure from the foot indirectly, such as through activation with a switch. When the foot is off the ground the brake does not make contact with the ring gear. However, when the foot is on the ground the brake holds the ring gear stationary. A switch, which is actuated by foot pressure, controls the excitation of a solenoid, powered by a battery. When the switch is actuated, the solenoid displaces and applies force to the brake.

Figure 6:
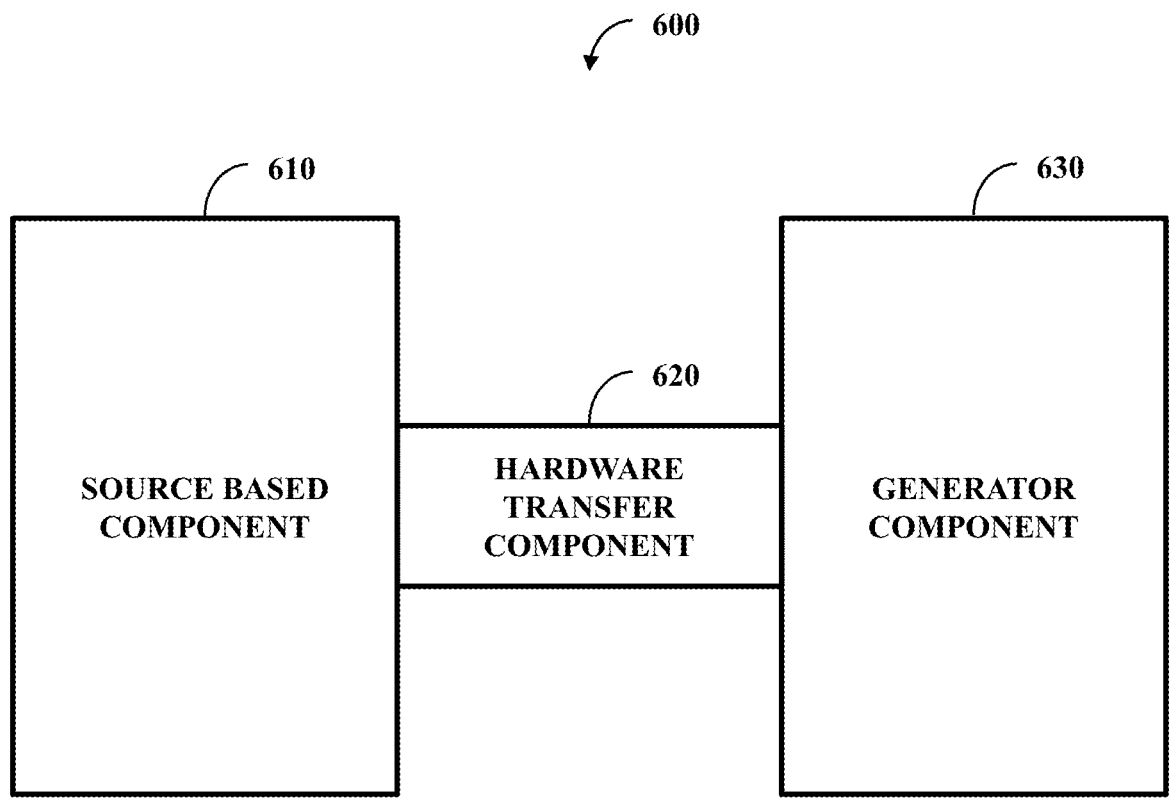
FIG. 6 illustrates one embodiment of a system comprising a source based component, a hardware transfer component, and a generator component.

FIG. 6 illustrates one embodiment of a system 600 comprising a source based component 610, a hardware transfer component 620, and a generator component 630. The source based component 610 can comprise a sun gear, a planet gear set physically coupled to the sun gear, a ring gear physically coupled to the planet gear set, a planet carrier configured to unify the planet gear set, and a brake. The planet gear set can comprise a first planet gear and a second planet gear, being of about equal size and opposed one another, which are separated by, and physically coupled to, the sun gear that is about equal size to the first and second planet gears. The ring gear can encompass the first planet gear, the second planet gear, and the sun gear, with the sun gear rotating at a ratio of about 1:4 against the planet carrier and the ring gear rotating at a ratio of about 1:1.33 against the planet carrier.

The brake (e.g., footwear item actuated drum brake) can be configured to, when engaged (e.g., when the wearer of the footwear item stands), hold the ring gear stationary while the ring gear can be floating along an axis when the brake is not engaged. In response to the ring gear being stationary, the sun gear can be configured to rotate. The source based component 610 can be retained within a footwear item (e.g., boot insole), with the ring gear being configured to rotate in response to foot movement (e.g., heel strike or ankle dorsiflexion) of a wearer of the footwear item when the brake is disengaged.

The source based component 610 can comprise other elements, such as the one-way clutch component or a spring (e.g., torsion spring that causes the ring gear to be floating due to resistance of the spring on the sun gear). The spring can physically couple to the sun gear and the hardware transfer component 620, such as be between the two. The hardware transfer component 620 can be the drive train, such as a tube configured to rotate or an interlocking gear set, and physically couple to the spring. In one embodiment, when the ring gear is stationary, the sun gear rotates such that the spring is supplied with potential energy. When the sun gear is stationary, the spring potential energy can be released and cause the hardware transfer component to rotate.

The generator component 630 can comprise a generator physically coupled to the spring (e.g., by way of the hardware transfer component 620) and also comprise electricity transfer hardware. The hardware transfer component 620, such as in response to unloading by the spring, can cause the generator to spin and in turn produce an electricity. This electricity can power a personal electronic device of the wearer of the footwear item, such as by the generator component 630 employing the electricity transfer hardware (e.g., hard wiring or a wireless power element) to transfer the electricity produced by the generator to a battery of the personal electronic device.

Figure 7:
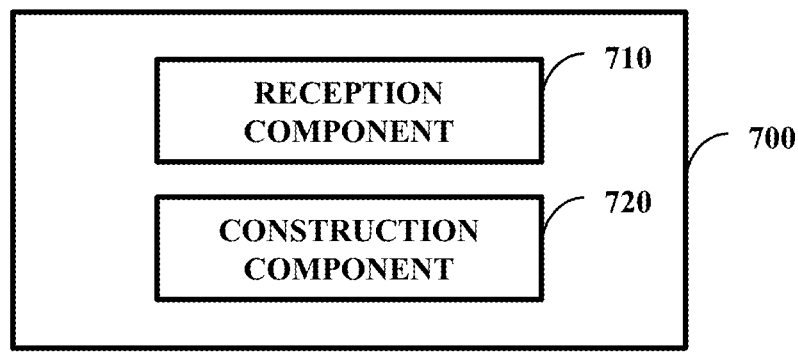
FIG. 7 illustrates one embodiment of a system comprising a reception component and a construction component.

FIG. 7 illustrates one embodiment of a system 700 comprising a reception component 710 and a construction component 720. The reception component 710 can receive design plans for wearable element, such as a footwear item. The construction component 720 can manage construction of the footwear item in view of the design plans (e.g., operate a manufacturing device).

In one embodiment, the reception component 710 receives an instruction to design an energy harvester. The reception component 710 can decide a size of the sun gear and planet gear, such as based on a wearer shoe size (e.g., the bigger the shoe size, the bigger the gear size). The construction component 720 can produce a construction regiment for construction of the energy harvester based on the energy harvester design from the reception component.

Figure 8:
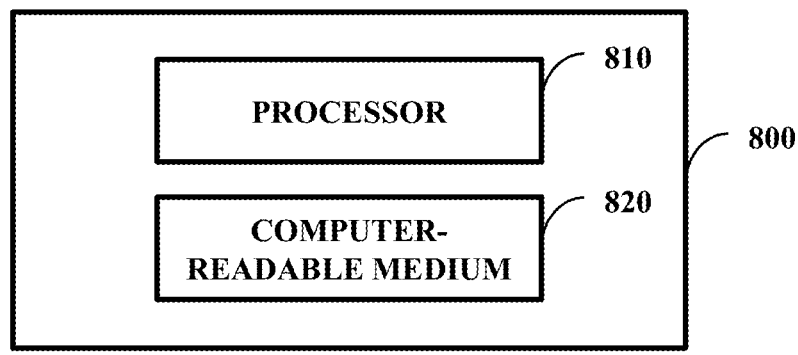
FIG. 8 illustrates one embodiment of a system comprising a processor and a computer-readable medium.

FIG. 8 illustrates one embodiment of a system 800 comprising a processor 810 and a computer-readable medium 620 (e.g., non-transitory computer-readable medium). In one embodiment, the computer-readable medium 820 is communicatively coupled to the processor 810 and stores a command set executable by the processor 810 to facilitate operation of at least one component disclosed (e.g., the reception component 710 of FIG. 7). In one embodiment, at least one component disclosed herein (e.g., the construction component 720 of FIG. 7) can be implemented, at least in part, by way of non-software, such as implemented as hardware by way of the system 800. In one embodiment, the computer-readable medium 820 is configured to store processor-executable instructions that when executed by the processor 810, cause the processor 810 to perform at least part of a method disclosed herein (e.g., at least part of the method 900-1000 discussed below).

Figure 9:
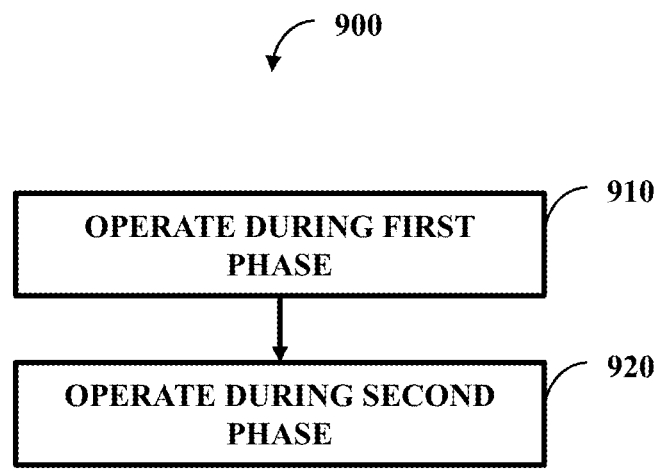
FIG. 9 illustrates one embodiment of a method comprising two actions.

FIG. 9 illustrates one embodiment of a method 900 comprising two actions 910-920. At 910, there can be operating a wearable planetary gear configuration (e.g., the planetary gear set 100 of FIG. 1) during a first phase and, at 920, there can be operating the wearable planetary gear configuration during a second phase that can about consecutively (time between first phase and second phase is about zero) follow the first phase. During the first phase (e.g., heel strike phase that effectuates engagement of a brake) the ring gear can be stationary, the planet carrier can be the input, the planet gear set can rotate, and the sun gear can rotate in response to the rotation of the planet gear set. During the second phase (e.g., heel off phase that effectuates disengagement of the brake) the sun gear can be stationary, the planet carrier can be the input, the planet gear set can rotate, and the ring gear can rotate in response to the rotation of the planet gear set.

In one embodiment, a linear or rotational spring is physically coupled to the sun gear as well as being physically coupled to the generator (e.g., by way of the drivetrain). During the first phase at 910, the sun gear can rotate such that the spring supplied with potential energy. During the second phase, the spring can release the potential energy to the generator to produce an electricity. The generator can produce the electricity during a subsequent edition of the first phase and power a battery (e.g., a battery associated with a wearer of a footwear item that comprises the wearable planetary gear configuration).

Figure 10:
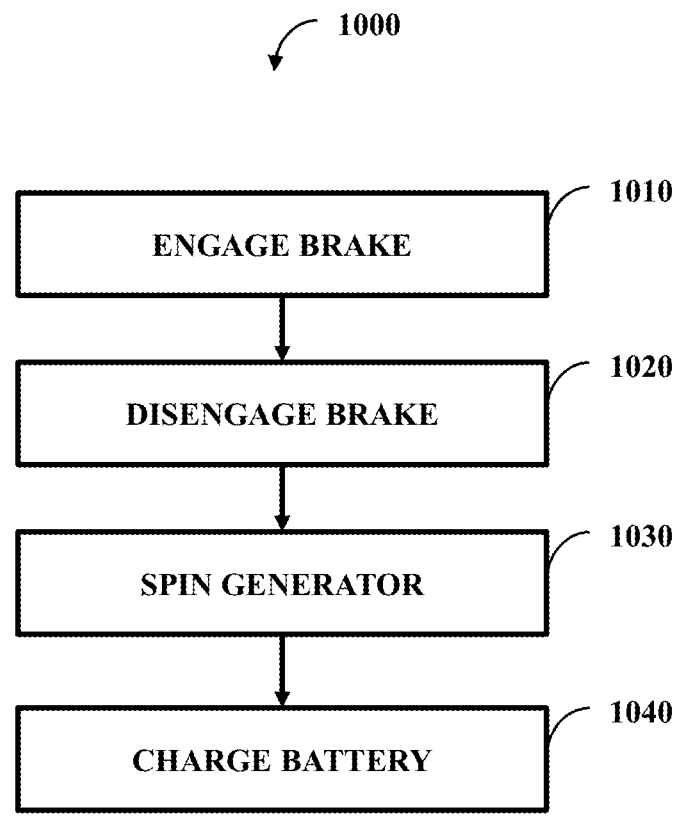
FIG. 10 illustrates one embodiment of a method comprising four actions.

FIG. 10 illustrates one embodiment of a method 1000 comprising four actions 1010-1040. At 1010 the brake can be engaged causing sun gear rotation and at 1020 the brake can be disengaged causing ring gear rotation. Rotation of the sun gear can, at 1030, lead to the generator spinning and producing electricity. At 1040, this electricity can be used to charge a personal electronic device battery.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
   a sun gear;
   a planet gear set physically coupled to the sun gear;
   a ring gear physically coupled to the planet gear set;

a planet carrier that unifies the planet gear set; and
a brake configured to, when engaged, hold the ring gear stationary,
where, in response to the ring gear being stationary, the sun gear is configured to rotate and
where the sun gear, the planet gear, the ring gear, and the planet carrier are retained within a wearable item.

2. The system of claim 1,
where the ring gear is configured to rotate when the brake is disengaged.

3. The system of claim 2,
where the sun gear rotates at a ratio of about greater than 1:2 against the planet carrier and
where the ring gear rotates at a ratio of about less than 1:1.5 against the planet carrier.

4. The system of claim 1,
where the wearable item is a joint-based wearable item such that rotation of the sun gear and rotation of the planet carrier are derived from movement of a joint of a wearer of the wearable item.

5. The system of claim 4,
where the wearable item is a knee brace.

6. A system, comprising:
a sun gear;
a planet gear set physically coupled to the sun gear;
a ring gear physically coupled to the planet gear set; and
a planet carrier that unifies the planet gear set, within a wearable item and
where the wearable item is an ankle torque device.

7. A system, comprising:
a sun gear:
a planet gear set physically coupled to the sun gear;
a ring gear physically coupled to the planet gear set;
a planet carrier that unifies the planet gear set; and
a one-way clutch component configured to provide input to the planetary gear during dorsiflexion of the ankle and configured to prevent input to the planetary gear during plantarflexion of the ankle,
where the sun gear, the planet gear, the ring gear, and the planet carrier are retained within a wearable item.

8. A system, comprising:
a sun gear;
a planet gear set physically coupled to the sun gear;
a ring gear physically coupled to the planet gear set;
a planet carrier that unifies the planet gear set;
a drivetrain physically coupled to the sun gear at a first drivetrain end; and
a generator physically coupled to a second drivetrain end of the drivetrain,
where the sun gear, the planet gear, the ring gear, and the planet carrier are retained within a wearable item,
where the first drivetrain end and the second drivetrain end are opposite one another,
where the planet gear set comprises a first planet gear and a second planet gear,
where the first planet gear and the second planet gear are of about equal size,
where the first planet gear and the second planet gear are opposed one another,
where the first planet gear and the second planet gear are separated by the sun gear,
where the sun gear and the first planet gear are of about equal size,
where the sun gear and the second planet gear are of about equal size,
where the first planet gear is physically coupled to the sun gear,
where the second planet gear is physically coupled to the sun gear, and
where the ring gear encompasses the first planet gear, the second planet gear, and the sun gear.

9. The system of claim 8,
where the sun gear, the planet gear, the ring gear, and the planet carrier are retained within a wearable item and
where the electricity powers a personal electronic device of a wearer of the wearable item.

10. A system, comprising:
a sun gear:
a planet gear set physically coupled to the sun gear;
a ring gear physically coupled to the planet gear set; and
a planet carrier that unifies the planet gear set,
where the sun gear, the planet gear, the ring gear, and the planet carrier are retained within a wearable item and
where the wearable item is a footwear insole housing.

11. A system, comprising:
a sun gear;
a planet sear set physically coupled to the sun ear;
a ring gear physically coupled to the planet gear set;
a planet carrier that unifies the planet gear set;
a spring physically coupled to the sun gear; and
a generator physically coupled to the spring,
where the sun gear, the planet gear, the ring gear, and the planet carrier are retained within a wearable item,
where the spring is retained by the wearable item,
where the generator is retained by the wearable item,
where when the ring gear is stationary, the sun gear rotates such that the spring supplied with potential energy, and
where when the sun gear is stationary, the spring potential energy is released to the generator such that the generator produces an electricity.

12. A system, comprising:
a sun gear;
a planet gear set physically coupled to the sun gear;
a ring gear physically coupled to the planet gear set; and
a planet carrier that unifies the planet gear set;
where the sun gear, the planet gear, the ring gear, and the planet carrier are retained within a wearable item,
where the ring gear is floating along an axis when the brake is not engaged, and
where the ring gear rotates in response to movement of a wearer of the wearable item.

13. A method, comprising:
operating a wearable planetary gear configuration during a first phase; and
operating the wearable planetary gear configuration during a second phase,
where the first phase and the second phase are about consecutive,
where the wearable planetary gear configuration comprises a sun gear, a planet gear set, a ring gear, and a planet carrier,
where the planet gear set is physically coupled to the sun gear,
where the ring gear is physically coupled to the planet gear set,
where the planet carrier unifies the planet gear set,
where during the first phase the ring gear is stationary, the planet carrier is the input, the planet gear set rotates, and the sun gear rotates in response to the rotation of the planet gear set, and
where during the second phase the sun gear is stationary, the planet carrier is the input, the planet gear set rotates, and the ring gear rotates in response to the rotation of the planet gear set.

14. The method of claim 13,
where a spring is physically coupled to the sun gear, where the spring is physically coupled to a generator,
where during the first phase the sun gear rotates such that the spring supplied with potential energy and
where during the second phase the spring releases the potential energy to the generator to produce an electricity.

15. The method of claim 14,
where the planet gear set comprises a first planet gear and a second planet gear,
where the first planet gear and the second planet gear are of about equal size,
where the first planet gear and the second planet gear are opposed one another,
where the first planet gear and the second planet gear are separated by the sun gear,
where the sun gear and the first planet gear are of about equal size,
where the sun gear and the second planet gear are of about equal size,
where the first planet gear is physically coupled to the sun gear,
where the second planet gear is physically coupled to the sun gear, and where the ring gear encompasses the first planet gear, the second planet gear, and the sun gear.

16. The method of claim 15,
where the first phase is effectuated by engagement of a brake due to a heel strike,
where the second phase is effectuated by disengagement of the brake due to a heel off, and
where the wearable planetary gear configuration is part of a footwear item.

17. A system, comprising:
a sun gear;
a planet gear set physically coupled to the sun gear;
a ring gear physically coupled to the planet gear set;
a planet carrier configured to unify the planet gear set; and
a brake configured to, when engaged, hold the ring gear stationary,
where the ring gear is floating along an axis when the brake is not engaged,
where, in response to the ring gear being stationary, the sun gear is configured to rotate,
where the sun gear, the planet gear, the ring gear, the planet carrier, and the brake are retained within a footwear item,
where the ring gear is configured to rotate in response to foot movement of a wearer of the footwear item when the brake is disengaged.

18. The system of claim 17,
where the planet gear set comprises a first planet gear and a second planet gear,
where the first planet gear and the second planet gear are of about equal size,
where the first planet gear and the second planet gear are opposed one another,
where the first planet gear and the second planet gear are separated by the sun gear,
where the sun gear and the first planet gear are of about equal size,
where the sun gear and the second planet gear are of about equal size,
where the first planet gear is physically coupled to the sun gear,
where the second planet gear is physically coupled to the sun gear,
where the ring gear encompasses the first planet gear, the second planet gear, and the sun gear,
where the sun gear rotates at a ratio of about 1:4 against the planet carrier, and where the ring gear rotates at a ratio of about 1:1.33 against the planet carrier.

19. The system of claim 18, comprising:
a spring physically coupled to the sun gear; and
a generator physically coupled to the spring,
where the brake is engaged when a wearer of the footwear item stands,
where when the ring gear is stationary, the sun gear rotates such that the spring supplied with potential energy,
where when the sun gear is stationary, the spring potential energy is released to the generator so the generator produces an electricity,
where the ring gear is floating due to resistance of the spring
where the spring is a torsion spring,
where the brake is a footwear item actuated drum brake, and
where the electricity powers a personal electronic device of the wearer of the footwear item.

* * * * *